United States Patent [19]

Hollars

[11] Patent Number: 5,607,031
[45] Date of Patent: Mar. 4, 1997

[54] BICYCLE BRAKE WITH DETACHABLE SLAVE CYLINDER

[76] Inventor: Anthony S. Hollars, 2700 E. Bilby Rd., Tucson, Ariz. 85706

[21] Appl. No.: 356,144

[22] Filed: Dec. 15, 1994

[51] Int. Cl.$^6$ .............................. B62L 1/00; F16D 65/12
[52] U.S. Cl. ............................................ 188/26; 188/18 A
[58] Field of Search ............................ 188/18 A, 24.11, 188/24.22, 26, 2 D, 71.6, 72.6, 73.32, 106 F, 344, 264 A, 264 AA

[56] References Cited

U.S. PATENT DOCUMENTS

| 4,170,369 | 10/1979 | Strutman | 188/26 X |
|---|---|---|---|
| 4,550,809 | 11/1985 | Kawaguchi | 188/18 A |
| 4,596,312 | 6/1986 | Kawaguchi | 188/18 A |

FOREIGN PATENT DOCUMENTS

| 6121172 | 10/1994 | European Pat. Off. | 188/26 |
|---|---|---|---|
| 86724 | 5/1984 | Japan | 188/26 |

Primary Examiner—Josie Ballato

[57] ABSTRACT

A wheel hub and disc braking system for a bicycle which provides a bicycle with greater braking power than traditional braking systems without increasing the weight or complexity of the vehicle. The invention utilizes a wheel hub mounted to the axle of a bicycle, a rotor attached to the wheel hub, and a caliper mounted to the fork and axle of a bicycle. Because of the increased hub diameter and flange width, the entire wheel is much more rigid than traditional designs. Also, as an option to add rigidity to the system, a ring is attached to the wheel hub. The attachment of the caliper to the fork and axle of a bicycle provides the system with greater strength and rigidity. In addition, this arrangement permits the pads of the caliper to contact the rotor's inner surface, making the caliper's operation and mounting in-line with the rotor's plane, something not possible with existing systems. Furthermore, even though the system utilizes a disc brake, the overall system is of comparable weight to traditional bicycle braking systems and simplistic in design. The invention further provides for retrofitability.

22 Claims, 8 Drawing Sheets

BICYCLE BRAKE WITH DETACHABLE SLAVE CYLINDER

BACKGROUND OF THE INVENTION

This invention relates generally to braking systems for bicycles and motorcycles and, more particularly, to braking systems utilizing disc brakes.

The use of disc brakes in motorized vehicles such as automobiles is well known in today's society. However, the extension of this technology to bicycles and other human-powered vehicles is a relatively recent development which has its own special considerations.

The first of these considerations is that of weight. One of the primary goals of bicyclists is to keep the weight of their bicycle to a minimum. Therefore, any braking system used for this purpose must be effective, yet light.

Second, heat dissipation is critical. As a bicycle, or any vehicle for that matter, stops, friction caused by the braking system changes kinetic energy into heat. In traditional bicycle braking systems which use the rim to brake, heat is dissipated freely along the entire circumference of the rim. This occurs because the rims and tires have a large area to absorb and radiate heat away from the rim surface. Further, the tire is in direct contact with the earth. These factors combine to facilitate and promote heat dissipation.

Conversely, the rotors used with disc brakes have a much smaller area than the tires and rims of bicycles. This results in heat being built up quickly and dissipated less effectively. It is common for a bicycle disc brake to reach temperatures in excess of 500 degrees. The heat generated in such a system is transferred to the hub shell where the bearings are located. Heating of the bearings and seals can cause damage.

Third, disc brake systems add to the complexity of the bicycle. Some systems make it difficult to change a tire which is a necessary task to all who ride. If the caliper must be "broken down" for the tire to be removed, the time required for repair and the chance of damage occuring to the caliper system increase significantly. Further, re-alignment of the rotor with the caliper is difficult in many systems.

Finally, existing disc braking systems are generally prone to damage. Unlike the components of a traditional bicycle braking system, a disc braking system utilizes a rotor. The rotor is generally placed on the outside of the wheel and, therefore, not protected. This could put a rider at an extreme disadvantage when riding in rough areas as rocks, branches, and other obstacles can easily damage the rotor.

It is clear that a light-weight and efficient disc braking system is needed that will provide the increased stopping power available from a disc brake while still providing all of the advantages available from a traditional bicycle braking system. The following invention accomplishes these goals.

SUMMARY OF THE INVENTION

The invention is a disc braking system for use with bicycles and other similar human-powered vehicles. The system provides a bicycle with the braking power desired from a disc brake while retaining all of the desirable characteristics of traditional bicycle braking systems.

The invention accomplishes these goals with a design essentially comprised of three main components: a wheel hub for attachment to the axle of a bicycle, a rotor, and a caliper. The wheel hub has two sets of spokes. The first set of spokes extends from the center of the hub while the second set extends from a periphery of the first set and supports a tire rim.

A rotor is attached to one side of the wheel hub along an end of the first set of spokes. Unlike conventional disc brake systems, this invention attaches the rotor along its outside diameter and places the caliper in an interior portion of the rotor for protection of both the caliper and the rotor.

The rotor and wheel hub are designed to maximize heat dissipation. Specifically, in one embodiment, the rotor has spaced-apart openings to encourage air flow. Further, the wheel hub is configured to encourage a cooling air flow. These two design characteristics act conjunctively to facilitate heat dissipation within the braking system.

The wheel hub is further shaped in such a way that it encircles a portion of the caliper. This allows the caliper to be mounted to both the axle and the fork of the bicycle without interfering with the rotation of the wheel hub. Mounting the caliper as such provides the system with greater rigidity and strength than current disc braking systems which only mount the caliper to the fork of the bicycle.

Mounting the caliper to the axle and the fork further provides the caliper with the capability to contact the rotor on its inside surface without interfering with rotation of the wheel hub. Consistent with this goal, the wheel hub has a large enough diameter to allow the caliper to contact the rotor as such.

In the preferred embodiment, the caliper is mounted via a caliper housing secured to the axle and removeably secured to the fork assembly. In removing the wheel assembly from the bicycle, the caliper housing remains attached to the axle and, consequently, to the wheel assembly. This maintains the caliper/rotor relationship, thereby eliminating the need to realign the caliper with the rotor.

In the preferred embodiment, the caliper housing is shaped to have a cavity on its top side which accepts a hydraulic slave cylinder to activate the caliper. Once placed in the cavity, the slave cylinder is secured; yet the removal of the entire slave cylinder is easily accomplished through manual manipulation of it from the caliper housing.

Preferably, the caliper is hydraulic in operation and hydraulically actuated by the operator. As the operator applies pressure to the braking handle, a master cylinder located within the handle presses hydraulic fluid to the caliper. In response, the caliper contacts the rotor, thereby braking the bicycle.

Alternatively, the design is used with a mechanically actuated hydraulic caliper or a mechanically actuated mechanical caliper.

The invention provides for a system with the braking power of a traditional disc brake in a light-weight, simple, and efficient design.

The invention, together with the various embodiments thereof, will be more fully explained by the accompanying drawings and the following descriptions.

DETAILED DESCRIPTION OF THE INVENTION

Figure 1:
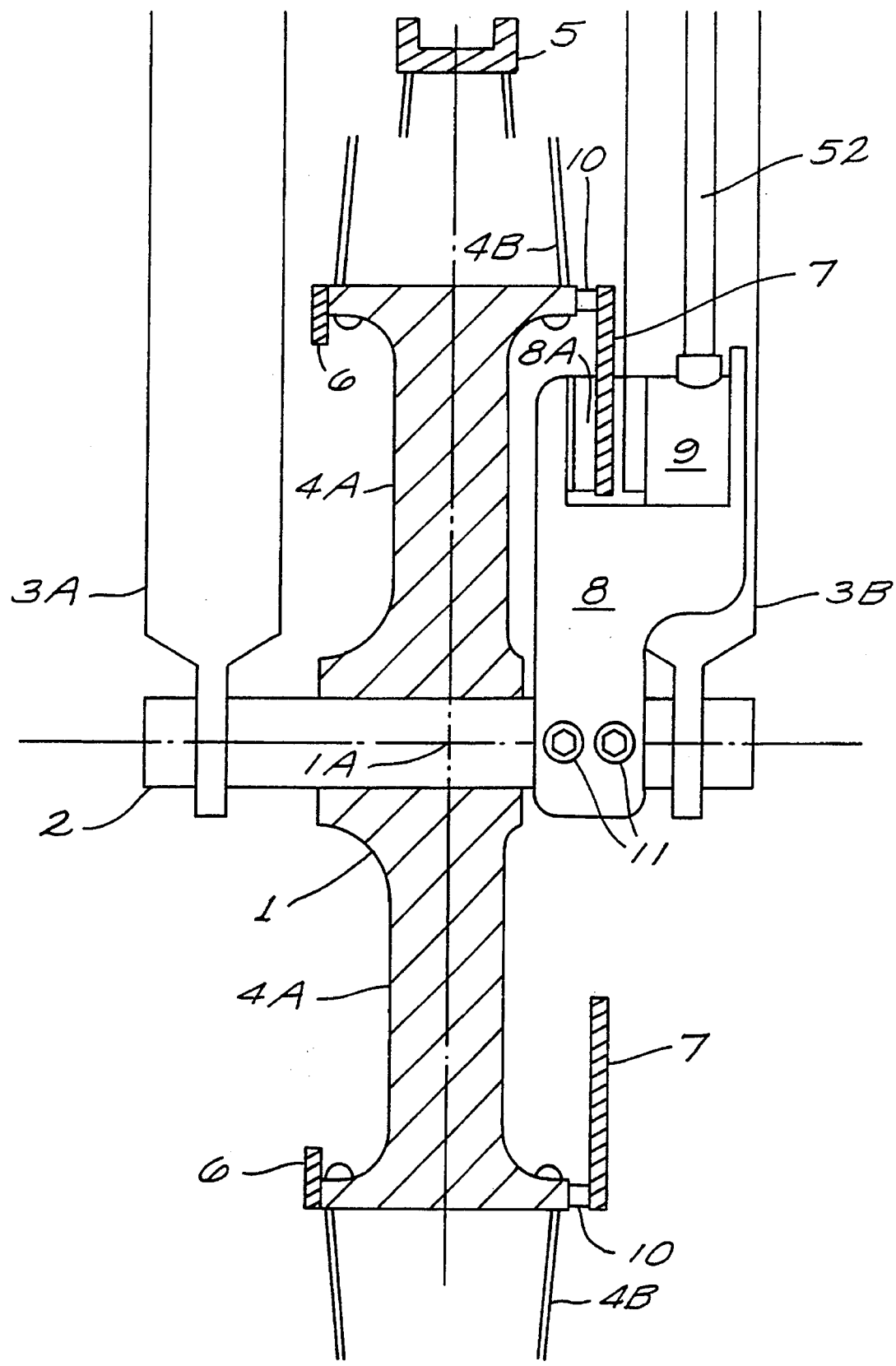
FIG. 1 is a front view of the preferred embodiment of the invention showing the major components and their relation to each other.

FIG. 1 shows the front view of the preferred embodiment of the invention.

The invention is a disc brake braking system for a bicycle. Wheel hub 1 is mounted to axle 2 of a bicycle between forks 3A and 3B. Wheel hub 1 has a first set of spokes 4A extending from its center 1A. In this context, one embodiment of the invention includes a replacement wheel hub to be installed as an after-market product for a traditional bicycle hub.

Figure 2:
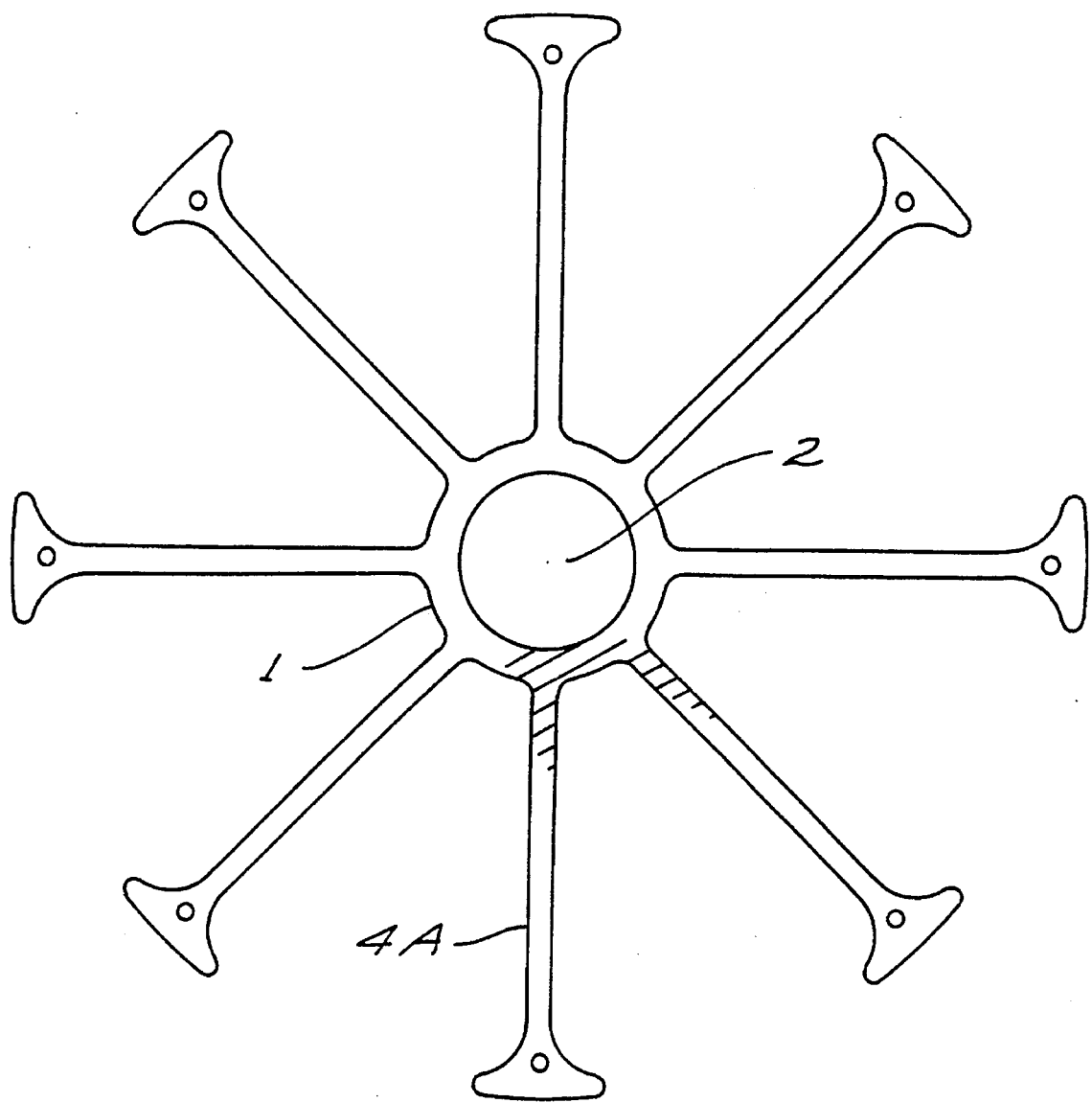
FIG. 2 is a side elevation view of one of the components of the preferred invention, the wheel hub.

As shown in FIG. 2, which is a side view of wheel hub 1, spokes 4A are spaced equidistant from each other. Further, spokes 4A are shaped such that they provide a cooling effect, preventing heat from being transferred to axle 2. This protects the integrity of the bearings and other essential components.

Shown in FIG. 1, a second set of spokes 4B extends from spokes 4A. Spokes 4B support tire rim 5 for the mounting of a tire (not shown).

In the preferred embodiment, ring 6 is attached to wheel hub 1 along the peripheral portion of hub 1.

Figure 3:
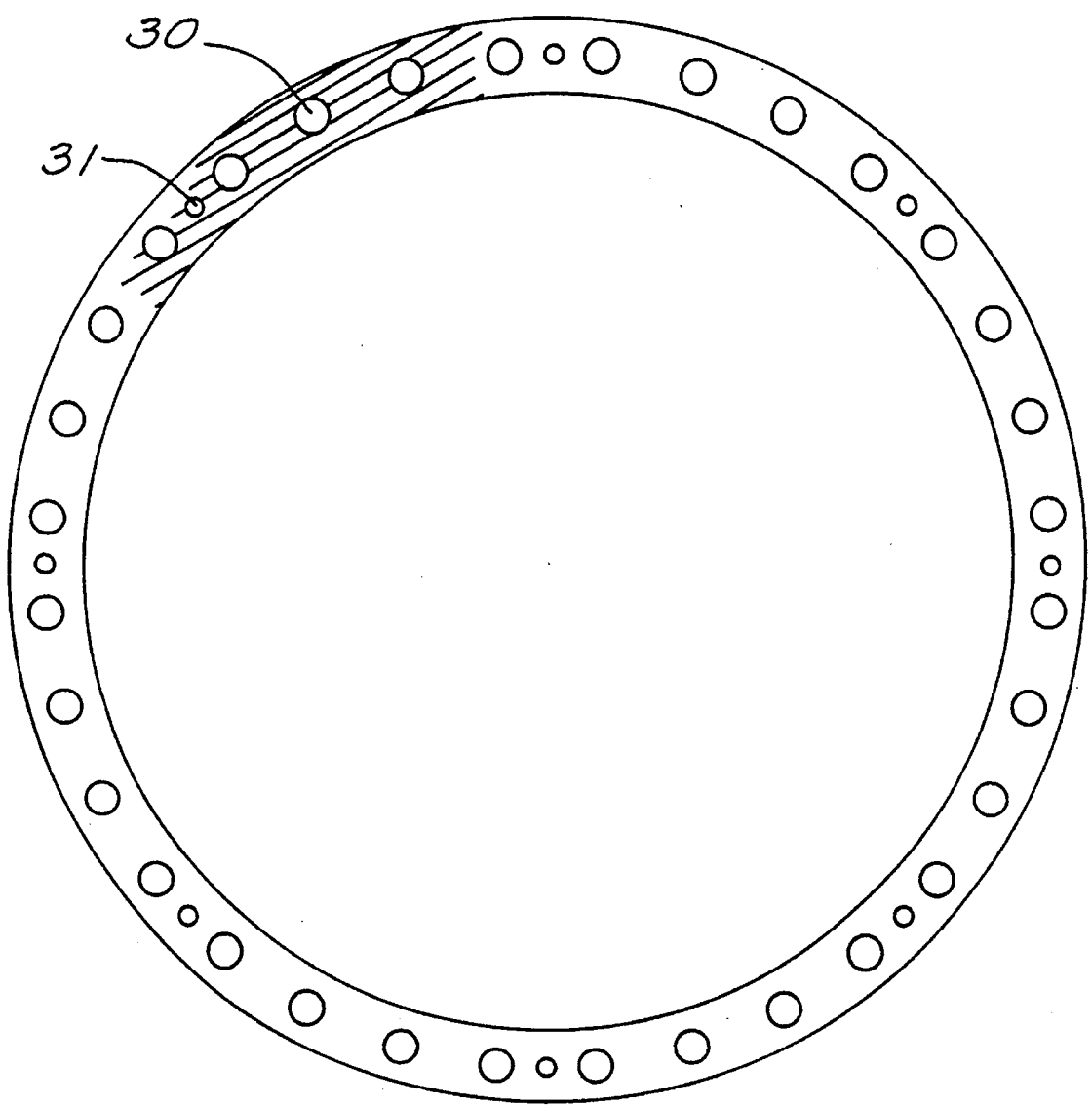
FIG. 3 is a side elevation view of one of the components of the preferred invention, the ring.

Shown in FIG. 3, which is a side view of ring 6, ring 6 has openings 30 which allow air to flow through, again to assist in heat dissipation. Ring 6 further has mounting holes 31 for mounting ring 6 to wheel hub 1. Ring 6 provides exceptional structural support for spokes 4A, thereby permitting spokes 4A, and, therefore, the entire system, to be even lighter.

Shown in FIG. 1, rotor 7 is attached to wheel hub 1 along a peripheral portion of rotor 7.

Figure 4:
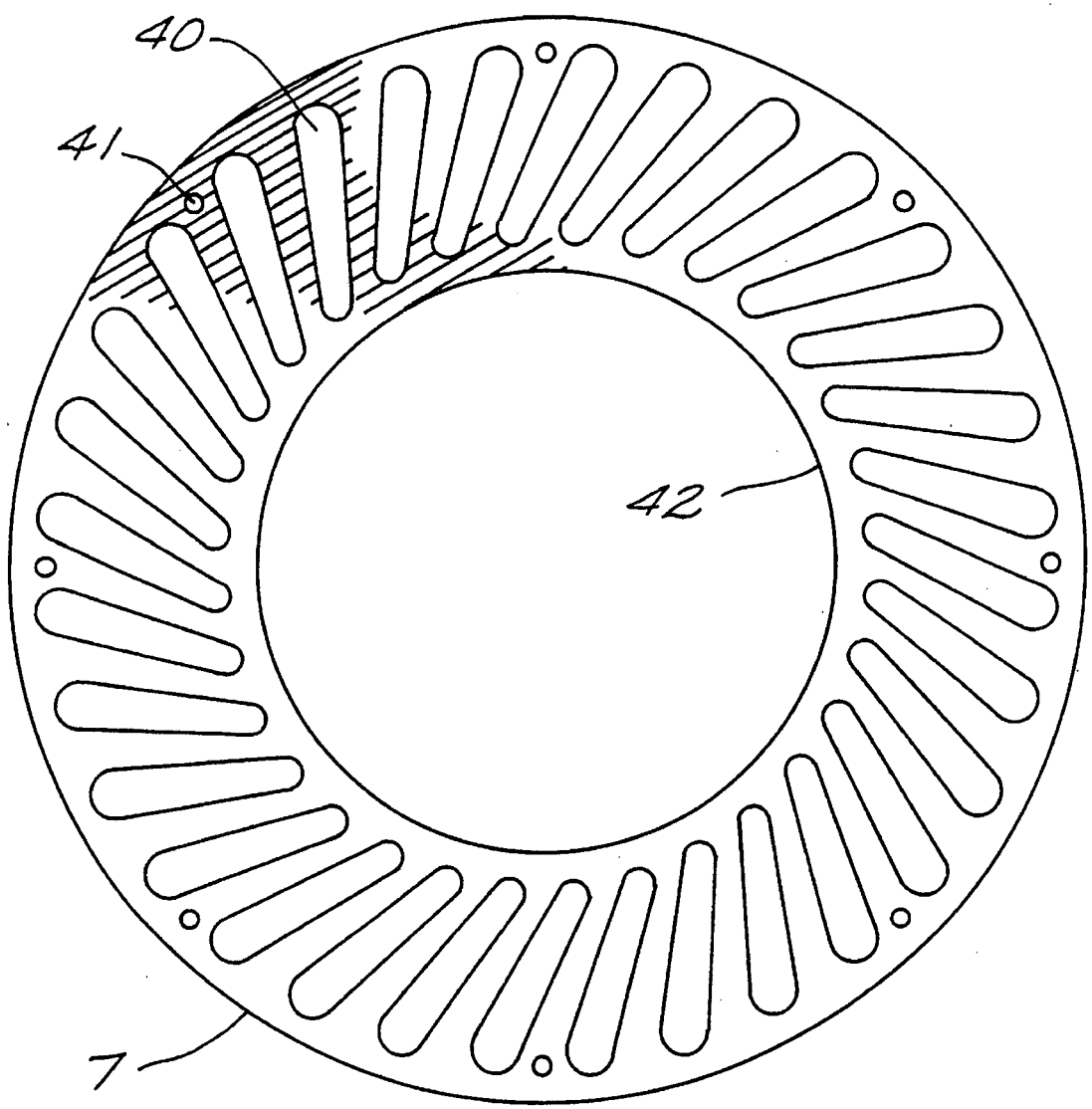
FIG. 4 is a side elevation view of one of the components of the preferred invention, the rotor.

Shown in FIG. 4, which is a side view of rotor 7, rotor 7 has openings 40 which allow air to flow through for its cooling. Rotor 7 further has mounting holes 41 for mounting rotor 7 to wheel hub 1. Rotor 7 is ring-shaped, having an inner portion 42 to be contacted by caliper 8. Such contact is further made possible by wheel hub 1 having a sufficiently large diameter to allow caliper 8 to contact inner portion 42 of rotor 7.

As shown in FIG. 1, bolts 10 provide a means for adjusting rotor 7. This enables the user to optimize the contact between rotor 7 and caliper pads 8A.

Also shown in FIG. 1, caliper 8 is mounted to fork 3B and axle 2 via a mounting bracket and mounting bolts 11. To keep caliper 8 from rotating about axle 2, a mounting bracket is used to affix caliper 8 to fork 3B. The mounting bracket may consist of a strap or any of a variety of possibilies accomplishing the same result. Note that mounting bolts 11 contact axle 2 only. This assures ease of removal of the wheel assembly. Caliper 8 is detachable from the mounting bracket.

As depicted in this figure, caliper 8 is mounted as such because of the shaping of spokes 4A. Spokes 4A are shaped such that a cavity is created in wheel hub 1. This allows wheel hub 1 to encircle a portion of caliper 8 and still rotate about axle 2. This cavity in wheel hub 1 further provides protection for caliper 8.

Brake pads 8A of caliper 8 controllably contact inner surface 42 (FIG. 4) of rotor 7 through pressure applied from slave cylinder 9.

Figure 5:
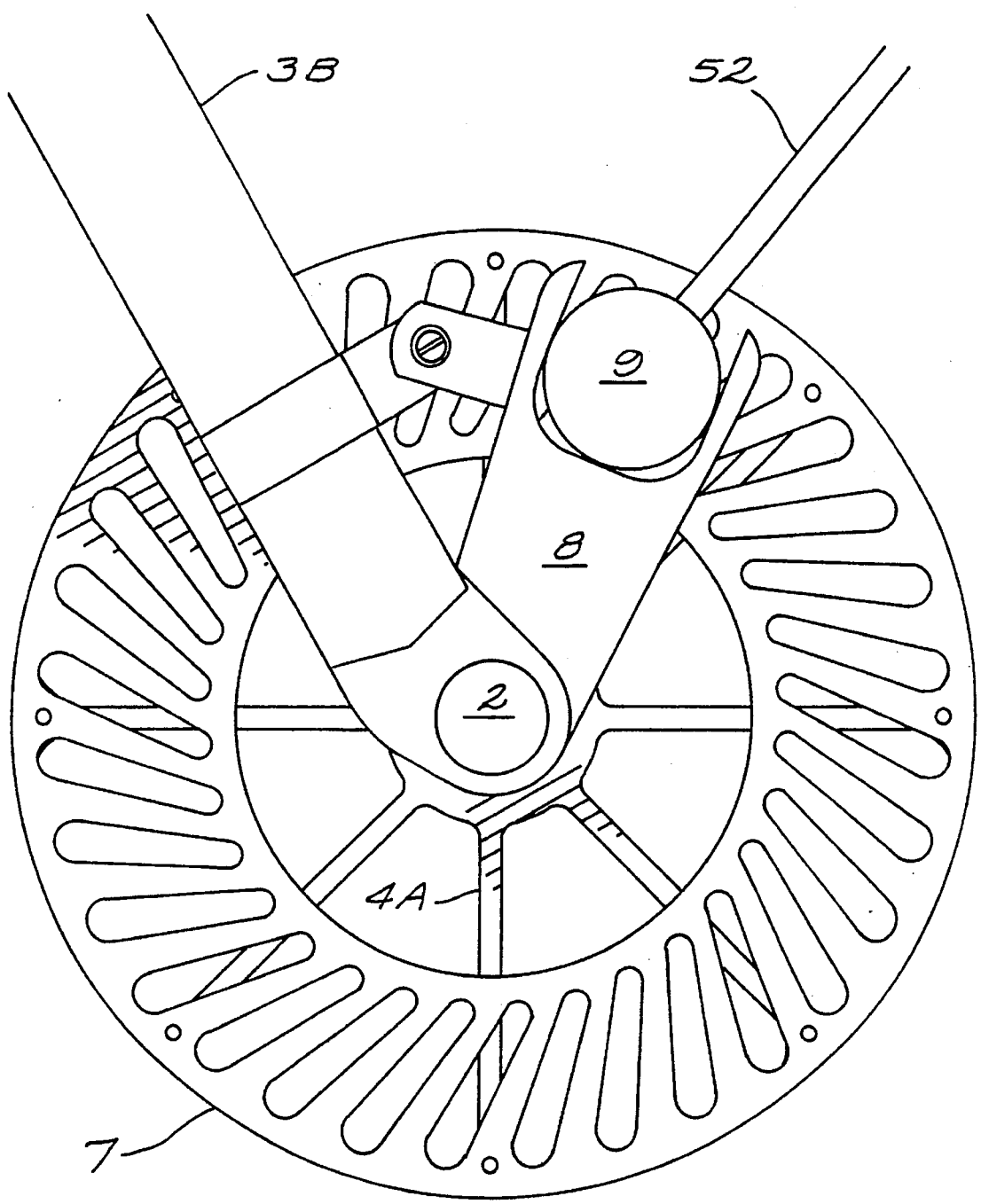
FIG. 5 is a detailed side elevation view of the preferred embodiment of the control components of the invention.
Figure 6:
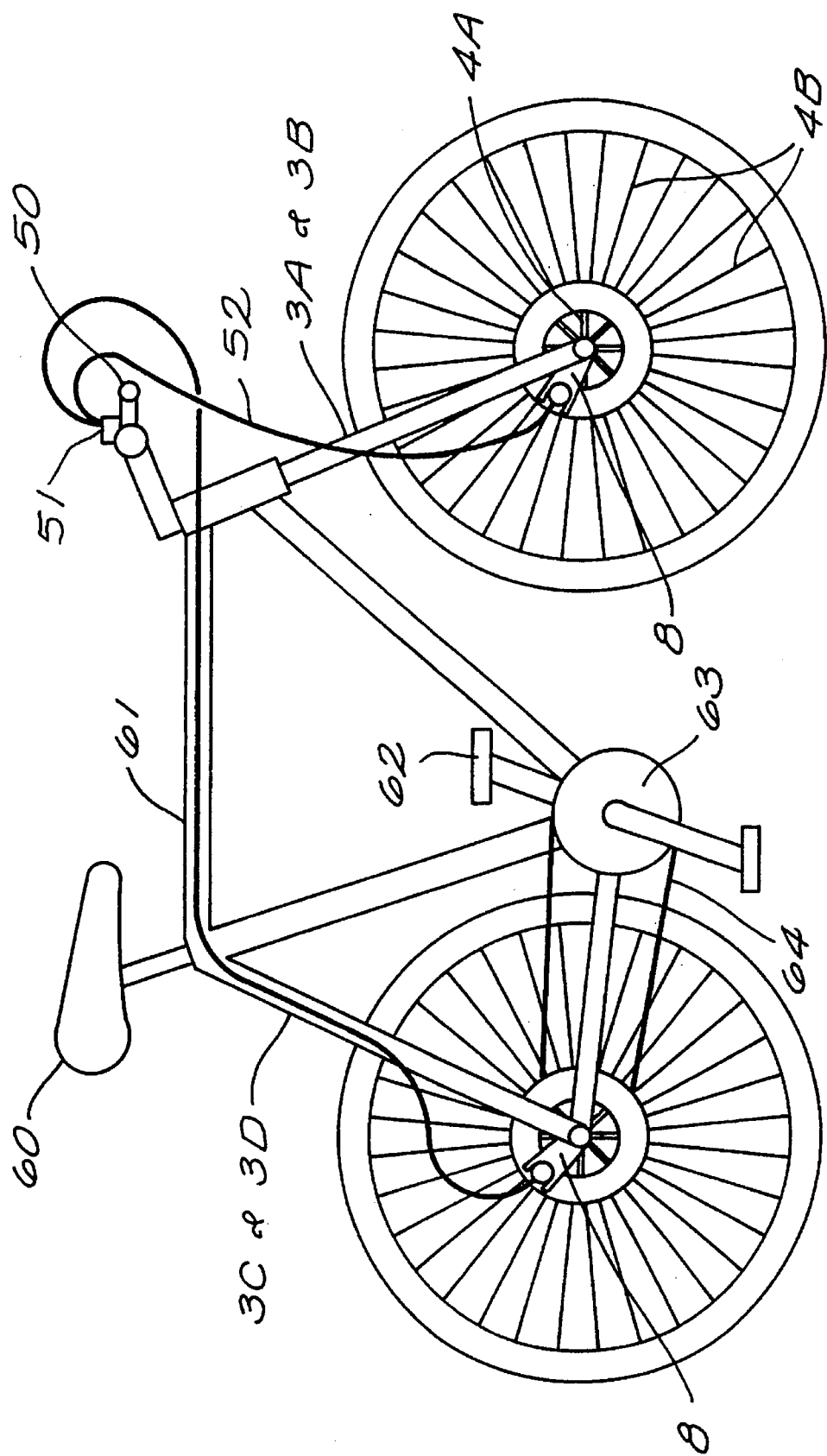
FIG. 6 is a side view of a bicycle showing the preferred braking system in place.

FIG. 5 is a detailed view of the major components of the invention. In the preferred embodiment, caliper 8 is hydraulic and is hydraulically controlled. An operator applies pressure to brake handle 50 (FIG. 6) which activates master cylinder 51 (FIG. 6). Master cylinder 51 (FIG. 6) releases hydraulic fluid which is transferred through brake hose 52 to slave cylinder 9 and caliper 8. Caliper 8 then causes pad 8A to make contact with rotor 7.

Note, since slave cylinder 9 is easily removed from caliper 8, no disconnection of slave cylinder 9 from brake hose 52 is required. This simplifies the process of wheel removal from the bicycle frame.

Figure 6A:
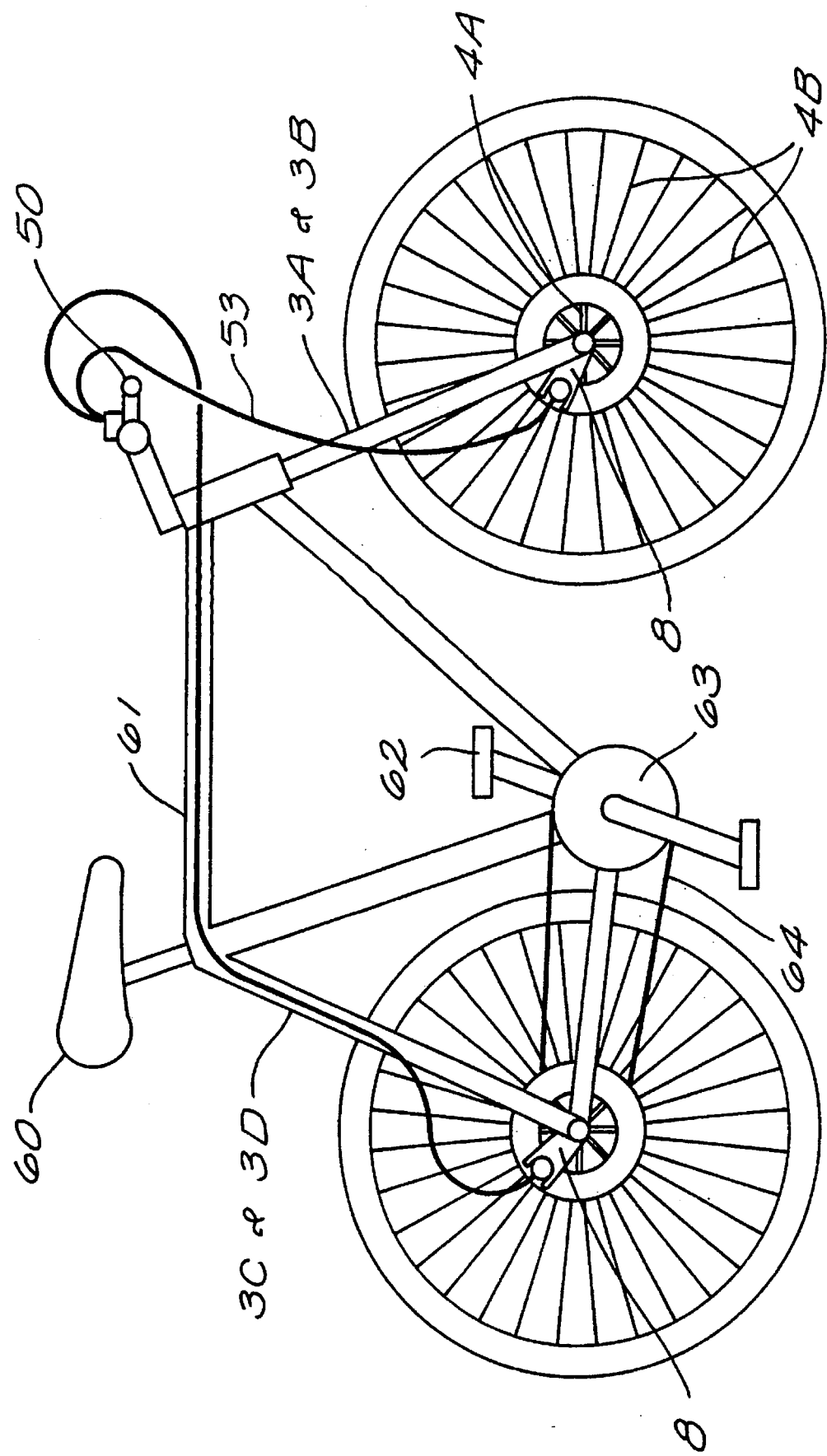
FIG. 6a is a side elevation view of a bicycle showing an alternative embodiment of the invention in place.
Figure 6B:
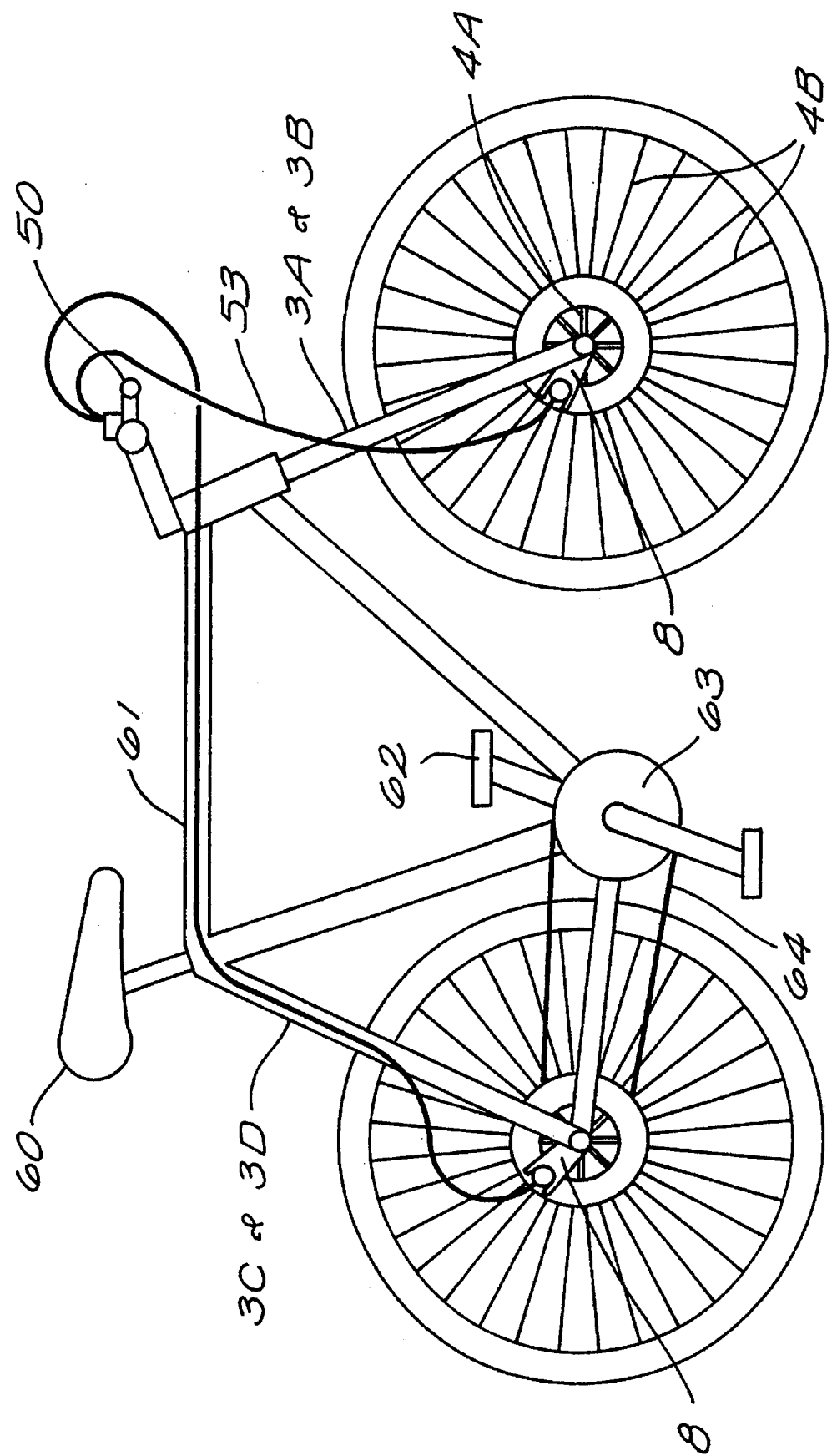
FIG. 6b is a side elevation view of a bicycle showing a second alternative embodiment of the invention in place.

In an alternative embodiment, shown in FIG. 6a, caliper 8 is hydraulic but is mechanically actuated. An operator applies pressure to brake handle 50 (FIG. 6) which causes cable 53 to press cylinder 9 (FIG. 5) which hydraulically activates caliper 8. Caliper 8 then causes pad 8A to make contact with rotor 7.

FIG. 6a shows yet another alternative embodiment where caliper 8 is mechanical and is mechanically actuated. In this embodiment, an operator applies pressure to brake handle 50 which activates caliper 8 via control cable 53. Caliper 8 then causes pad 8A to make contact with rotor 7.

FIG. 6 shows a bicycle utilizing the preferred braking system. The user sits in seat 60 which is supported by frame 61. To power the bicycle, the user applies force to pedals 62 which rotate sprocket 63. Sprocket 63 mates with chain 64. By rotating sprocket 63, chain 64 moves. Chain 64 is mechanically connected to the rear wheel. As sprocket 63 rotates, so does the rear wheel, thereby enabling the bicycle to be powered by user-supplied energy.

Frame 61 includes a front set of forks 3A, 3B and a rear set of forks 3C, 3D for the mounting of the front and rear axles, respectively. Mounted to each set of forks and axles is the braking system as previously illustrated and described.

From the foregoing, it is understood by those skilled in the art that the disclosed invention is a braking system which implements a disc brake for use with bicycles and similar human-powered vehicles. Even though it uses a disc brake, the disclosed invention is still light-weight, simple in design, and provides for easy access to, and removal of, the bicycle wheel for repair and security purposes.

What is claimed is:

1. An improved bicycle comprising:
   a) a frame member;
   b) a fork assembly attached to said frame member;
   c) a rear wheel assembly rotatably attached to said frame member;
   d) a means for driving said rear wheel assembly using operator-supplied energy; and,
   e) a braking system including,
      1) a wheel hub rotatably attached to an axle extending between said fork assembly, said wheel hub having a center section substantially circular in shape with a first set of spokes extending therefrom, said spokes spaced equidistant from each other,
      2) a second set of spokes extending from said first set of spokes, said second set of spokes supporting a tire rim for the mounting of a tire, 3) a rotor being ring-shaped and fixably attached to a first side of said wheel hub proximal to said second set of spokes and along a peripheral portion of said rotor, 4) a caliper mounted to said fork and said axle, said caliper having moveable pads for controllably contacting the portion of said rotor closest to said rotor's axis of rotation, 5) a circular ring fixably attached to a second side of said wheel hub, 6) a hand-operated lever hydraulically connected to said caliper and wherein said pads of said caliper are activated by operator-supplied hydraulic pressure, and, 7) a slave cylinder connected to said hand-operated lever and being responsive to operator pressure for causing contact between said caliper and said rotor, and wherein said caliper includes means for detaching said slave cylinder therefrom while maintaining a connection between said hand-operated lever and said slave cylinder.

2. The bicycle according to claim 1 wherein said ring has a plurality of openings for air flow therethrough.

3. The bicycle according to claim 1 wherein said tire rim and said wheel hub are centered along a common plane and wherein the width of said tire rim is less than the combined width of said rotor and said wheel hub.

4. The bicycle according to claim 1 wherein said wheel hub includes a cut-away section such that at least a portion of said caliper is partially contained within a cavity portion in said wheel hub.

5. The bicycle according to claim 4 further including a mounting bracket attached to said axle and said fork, said bracket for maintaining said caliper in relationship to said rotor.

6. The bicycle according to claim 1 wherein said rotor has a plurality of openings for air flow therethrough.

7. A wheel and braking system combination for a vehicle having a fork assembly, said wheel and braking system combination comprising:

a) a wheel hub having a first and second side, said wheel hub rotatably attached to an axle extending between said fork assembly, said wheel hub having a center section with spokes extending therefrom, said spokes spaced equidistant from each other;

b) a rotor being ring-shaped and fixably attached to said first side of said wheel hub;

c) a caliper mounted to said fork and said axle, said caliper having moveable pads for controllably contacting an inner portion of said rotor;

d) a slave cylinder positioned to cause said caliper to contact said rotor;

e) a hand-operated lever mechanically connected to said slave cylinder, said hand-operated lever activated by operator-supplied mechanical pressure; and f) means for detaching said slave cylinder from said caliper while maintaining a connection between said hand-operated lever and said slave cylinder.

8. The wheel and braking system combination according to claim 7 wherein a ring is fixably attached to said second side of said wheel hub.

9. The wheel and braking system combination according to claim 8 wherein said ring has a plurality of openings for air flow therethrough.

10. The wheel and braking system combination according to claim 7 wherein said rotor has a plurality of openings for air flow therethrough.

11. The wheel and braking system combination according to claim 7 wherein a cross-section of said wheel hub is shaped such that at least a portion of said caliper is partially contained within a cavity portion created by said wheel hub.

12. The wheel and braking system combination according to claim 11 wherein said caliper is hydraulic.

13. The wheel and braking system combination according to claim 12 further including a slave cylinder for contacting said caliper.

14. The wheel and braking system combination according to claim 11 further including a mounting bracket attached to said axle and said fork, said bracket for maintaining said caliper in relationship with said rotor.

15. The wheel and braking system combination according to claim 14 wherein said mounting bracket is detachable from said fork.

16. A replacement wheel hub and braking system for a bicycle having a fork assembly and a hand-operated lever, said replacement wheel hub and braking system comprising:

a) a wheel hub rotatably attached to an axle extending between said fork assembly;

b) a rotor being ring-shaped and fixably attached to a first side of said wheel hub;

c) a caliper mounted to said fork and said axle, said caliper having moveable pads being responsive to mechanical manipulation for controllably contacting an inner portion of said rotor; and, d) a slave cylinder connected to said hand-operated lever and being responsive to operator pressure therefrom for causing contact between said caliper and said rotor, and wherein said slave cylinder includes means for separating said slave cylinder and said caliper while maintaining a connection between said hand-operated lever and said slave cylinder.

17. The replacement wheel hub and braking system according to claim 16 wherein a ring is fixably attached to a second side of said wheel hub.

18. The replacement wheel hub and braking system according to claim 17 wherein said ring has a plurality of openings for air flow therethrough.

19. The replacement wheel hub and braking system according to claim 16 wherein said rotor has a plurality of openings for air flow therethrough.

20. The replacement wheel hub and braking system according to claim 16 wherein said tire rim and said wheel hub are centered along a common plane and wherein the width of said tire rim is less than the combined width of said rotor and said wheel hub.

21. The replacement wheel hub and braking system according to claim 20 wherein at least a portion of said caliper is contained within a cavity formed said wheel hub.

22. The replacement wheel hub and braking system according to claim 21 further including a mounting bracket attached to said axle and said fork, said bracket for maintaining said caliper in relationship to said rotor.

* * * * *